United States Patent [19]
Daniels

[11] Patent Number: 5,814,911
[45] Date of Patent: Sep. 29, 1998

[54] MODULE AND METHOD FOR CONNECTING TIMER TO AN ELECTRIC MOTOR

[75] Inventor: Nicholas R. Daniels, Dellwood, Mo.

[73] Assignee: Emerson Electric Co., St. Louis, Mich.

[21] Appl. No.: 695,167

[22] Filed: Aug. 8, 1996

[51] Int. Cl.⁶ ................................................. H02K 11/00
[52] U.S. Cl. ...................... 310/68 R; 310/68 A; 310/71; 310/89; 310/91
[58] Field of Search ............................... 310/68 R, 68 A, 310/71, 89, 87, 90

[56] References Cited

U.S. PATENT DOCUMENTS

| | | | |
|---|---|---|---|
| 3,803,579 | 4/1974 | Compton | 307/141 |
| 3,983,928 | 10/1976 | Barnes | 165/12 |
| 4,370,565 | 1/1983 | Hayden | 340/309 |
| 4,808,865 | 2/1989 | King | 310/71 |
| 4,854,373 | 8/1989 | Williams et al. | 165/46 |
| 4,959,512 | 9/1990 | Cole et al. | 200/38 R |
| 5,012,226 | 4/1991 | Love | 340/576 |
| 5,079,464 | 1/1992 | King et al. | 310/89 |
| 5,165,107 | 11/1992 | Hand et al. | 340/309.6 |
| 5,455,734 | 10/1995 | Foreman et al. | 361/118 |
| 5,541,461 | 7/1996 | Joseph | 310/71 |

Primary Examiner—Steven L. Stephan
Assistant Examiner—Elvin G. Enad
Attorney, Agent, or Firm—Howell & Haferkamp, L.C.

[57] ABSTRACT

A module and method are disclosed for adding an electrical device such as a timer to an existing electric motor such as that found in a whirlpool bath system for driving a water pump. The module includes an input connector configured for mating with a connector on a power cable, an output connector configured for mating with a power connector on the electric motor, and a timer electrically connected between the input and output connectors. The method of adding an electrical device to an existing electric motor using the module comprises the steps of removing the power cable connector from the motor power connector, connecting the module output connector to the motor power connector, and connecting the power cable connector to the module input connector. In this manner, an electrical device which is prewired between the module connectors can be coupled to an existing electric motor without the use of tools, without the aid of an electrician, and without any risk of serious electrical shock.

21 Claims, 3 Drawing Sheets

MODULE AND METHOD FOR CONNECTING TIMER TO AN ELECTRIC MOTOR

BACKGROUND OF THE INVENTION (1) Field of the Invention

The present invention pertains to a module and method for connecting an electrical device to an existing electric motor and, more particularly, to a module and method for connecting a timer to the electric pump motor of a whirlpool bath system.

(2) Description of the Related Art

Electric motors are used in a vast number of applications for converting electrical energy into mechanical motion. In one such application, an electric motor is used to drive the water pump of a whirlpool bath or spa system for providing therapeutic and forceful whirling currents of hot water. When used with the pump of a whirlpool bath system, the electric motor is provided with an on/off switch at a minimum, and is oftentimes provided with an electrical timer for selectively activating the pump for only a specified period of time. When so provided, the timer is pre-wired into the electrical power circuit of the electric motor when the motor is manufactured. The timer contributes to the enjoyment of the whirlpool bath by allowing one to control the length of time spent relaxing in the bath without having to consciously monitor the present time with a clock or watch. Timers also contribute to the safety of whirlpool baths because they can prevent one from spending an excessive amount of time in the whirlpool bath, which has been known to induce relaxation to the point of creating a risk of drowning. Thus, there are several benefits to providing whirlpool bath systems with electrical timers.

Despite these benefits, a large number of whirlpool bath systems are in present use which do not include timers, either because a timer was not a standard feature or option at the time of purchase, or because this option was declined by the consumer. In any event, it is oftentimes desired to add a timer to the electric pump motor after the whirlpool bath system has been manufactured, purchased, and installed.

An electric pump motor which is not equipped with a timer is illustrated in FIG. 1. The motor 10 includes a power connector 12 which is configured to mate with a complimentary connector 14 on a power cable 16 for conducting electrical power to and energizing the motor 10. The motor power connector 12 is shown positioned on a top side of a motor end shield 18. An on/off switch 20 is also shown which is connected into the electrical power circuit of the motor between the motor power connector 12 and other internal components (not shown).

In order to add an electrical timer to an existing electric motor, the end shield of the motor must ordinarily be removed so that the timer can be properly wired into the electrical power circuit of the motor. Given the relative inexperience of the average consumer with electrical wiring, this procedure may be too complex to perform without the aid of an experienced electrician, and can pose a serious risk of electrical shock if proper procedures are not followed. Having the work performed by an electrician is almost always an option, but might be cost prohibitive or unacceptably inconvenient. Regardless of whether the timer is to be added by the consumer or an electrician, removal of the motor end shield to perform this procedure also exposes other motor components and wiring which were formerly protected by the end shield, thereby rendering these components and wiring susceptible to inadvertent damage. Thus, given the risk of electrical shock, the associated cost and inconvenience with hiring an electrician, and the additional risk of inadvertent damage to the electric motor, timers are seldom added to the electric pump motor of a whirlpool bath system after the system has been manufactured and installed. This is despite the desirability and convenience of a whirlpool bath system that includes an electrical timer.

What is needed is a device and method that enables the ordinary consumer to easily add a timer, or any other electrical device, to an electric motor without any risk of serious electrical shock. Such a device and method would preferably enable the consumer to add the timer to the electric motor without needing special tools or the assistance of an electrician, and without risking inadvertent damage to the electrical components and wiring that are housed within the motor and protected by the motor end shield.

SUMMARY OF THE INVENTION

The inventor hereof has succeeded at meeting these and other needs by designing and developing a module and method for adding an electrical device such as a timer to an existing electric motor in a safe, quick, and relatively inexpensive manner. The module is configured to house the timer and can be interposed between the power connector on the motor and the connector on the power cable that energizes the motor. In this manner, the module of the present invention allows the ordinary consumer to conveniently add an electrical device to an electric pump motor, or any other electric motor, without any need for special tools or an electrician.

The module of the present invention includes an input connector configured for mating with the power cable connector, and an output connector configured for mating with the motor power connector. The module may also include the electrical device electrically connected between the module connectors. Alternatively, the electrical device can be installed into the module by the consumer, particularly where there are several electrical devices to choose from. A housing is provided for sheltering the electrical device and supporting the module connectors. The module connectors are preferably secured to and extend downwardly from a bottom surface of the housing so that the electrical device is accessible from the top side of the module while the electrical connections with the motor and the power cable are made on a bottom side of the module. The module connectors preferably include a mechanical coupling in addition to an electrical coupling to maintain the electrical connections with the motor power connector and the power cable connector, and to prevent improper mating.

The housing includes a pivotable cover that, when closed, protects the electrical device from inadvertent contact including contact with splashed water or precipitation if the electric pump motor is installed outdoors. When open, the cover allows access to the electrical device as needed. The pivotable cover is substantially transparent so that when closed, the electrical device can be observed through the cover without having to pivot the cover to its open position. Both the housing and the transparent cover are preferably constructed from plastic so as to resist corrosion. The module housing also includes one or more drain holes extending therethrough to prevent any water which does enter the housing from collecting and inducing a short circuit.

The housing also includes several alignment pins extending upwardly from its bottom surface for insertion into apertures formed in the electrical device and a protective shield. The electrical device can be positioned in the housing with the alignment pins extending through the apertures so the alignment pins can then be ultrasonically deformed, or "coined," to permanently secure the electrical device to the housing. The protective shield also has apertures for securing the shield to the housing with the alignment pins, and is positioned over the electrical connections between the electrical device and the module connectors to shield the consumer from these connections so as to prevent an electrical shock. The module also includes quick-connect brackets for securing the module to the electric motor. Preferably, two pincer-shaped brackets are attached to the module housing which can be snap-fitted around the cylindrical periphery of the motor housing to quickly secure the module to the electric motor without the use of tools. However, where the module output connector includes a mechanical coupling for maintaining the electrical connection between the output connector and the motor power connector, the mechanical coupling also serves to secure the module to the electric motor such that the brackets may be unnecessary.

In the preferred embodiment, the electrical device is a timer, and the module is configured for coupling the timer to the electric pump motor of a whirlpool bath system. However, the module of the present invention can also be used to couple other types of electrical devices to the electric pump motor of a whirlpool bath system, or to electric motors used in other applications.

Where the electrical device is to be connected to an electric motor having a power connector positioned on a top side of the motor end shield, a portion of the housing bottom surface is tapered upwardly or otherwise relieved so as to provide room to grasp the module output connector for mating with the motor power connector. The housing is also sized, and the module connectors are positioned, so that the portion of the housing that supports the input connector hangs over the end of the motor when the module is secured to the motor. This configuration further provides room for grasping and mating the module output connector with the motor power connector, as well as for grasping and mating the module input connector with the power cable connector.

In accordance with the method provided by the present invention, an electrical device can be easily coupled to an existing electric motor using a module having an input connector configured for mating with the power cable connector and an output connector configured for mating with the motor power connector. The method comprises the steps of disconnecting the power cable connector from the motor power connector, connecting the module output connector to the motor power connector, and connecting the power cable connector to the module input connector. The method also comprises the steps of electrically connecting the electrical device between the module connectors, and positioning the electrical device within the module housing. Thus, the module and method of the present invention allow an electrical device such as a timer to be quickly coupled to an electric motor by the ordinary consumer without any need for special tools or an electrician, and without any risk of serious electrical shock.

While the principal advantages and features of the present invention have been described above, a greater understanding of the invention may be attained by referring to the drawings and the detailed description of the preferred embodiment which follow.

DETAILED DESCRIPTION OF THE PREFERRED EMBODIMENT

Figure 1:
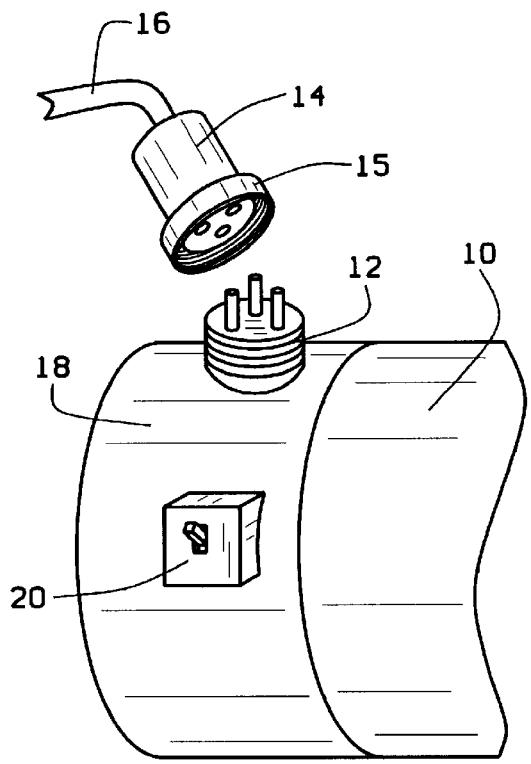
FIG. 1 is a partial front view of an electric pump motor.

The present invention provides a module 30 and method which enable an ordinary consumer to quickly and safely connect an electrical device such as a timer to an electric motor without the use of special tools, without the need for an electrician, and without any risk of serious electrical shock. In a preferred embodiment of the invention, the module 30 includes the electrical device, and the electrical device is pre-wired between the module connectors 38, 40 so that the consumer can easily couple the electrical device to an electric motor 10 by simply interposing the module 30 between a power cable connector 14 and a power connector 12 on the electric motor 10. However, where a consumer may desire to add any one of a variety of electrical devices to an electric motor, the module 30 can be provided without the electrical device. In this alternate embodiment, the consumer will select the electrical device to be added, and then electrically connect the device between the module connectors 38, 40 before installing the module 30 on the electric motor 10. Thus, while the module and method of the present invention will be described and depicted for coupling a pre-wired timer module to an electric motor, it should be understood that the invention is not so limited.

Figure 2:
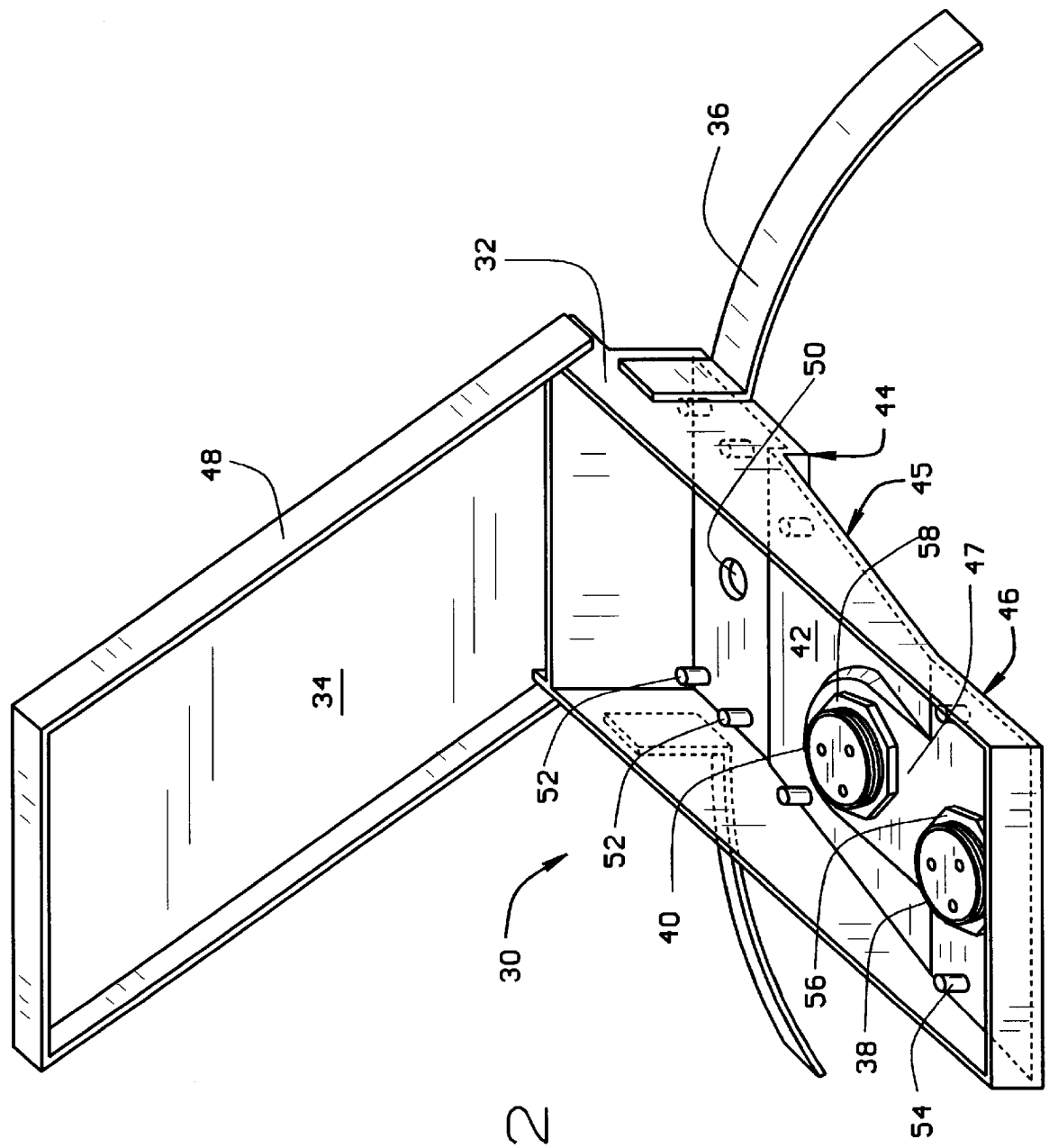
FIG. 2 is an isometric view of a module according to the present invention.

The module of the present invention is shown in FIG. 2 before a timer is connected between the module connectors. As shown therein, the module 30 includes a housing 32, a cover 34 pivotably attached to the housing 32 along a backside thereof, and quick-connect brackets 36 which are attached to the sides of the housing 32, either integrally or as separate parts. The module 30 also includes an input connector 38 configured for mating with the power cable connector 14 shown in FIG. 1 from a bottom side of the housing, as well as an output connector 40 configured for mating with the motor power connector 12 shown in FIG. 1, also from a bottom side of the housing. Given that the power cable connector 14 was designed for mating, and was previously mated, with the motor power connector 12, the input connector 38 is preferably identical to the motor power connector 12 while the output connector 40 is preferably identical to the power cable connector 14. However, other types of connectors can be employed as the module connectors so long as proper electrical mating with the motor power connector 12 and the power cable connector 14 is ensured.

As shown in FIG. 2, a bottom surface 42 of the housing 32 includes a substantially flat rear portion 44, a tapered middle portion 45, and a substantially flat forward portion 46. The tapered middle portion 45 provides finger room for grasping and mating the input connector 38 and the output connector 40, which extend downwardly from the bottom surface 42 of the housing 32, with the power cable connector 14 and the motor power connector 12, respectively, as will be apparent. A drain hole 50 is also provided on the flat rear portion 44 of the bottom surface 42 so as to prevent any water that does enter the housing from pooling and promoting undesirable short circuiting of the module connectors and/or the timer. The bottom surface 42 of the housing 32 is also provided with several upwardly extending alignment pins 52 and 54 for positioning and securing the electrical timer and a protective shield to the housing, as explained further below.

In the preferred embodiment of the invention, the housing 32 and cover 34 are constructed from plastic so as to resist corrosion which may otherwise occur in the moist or humid environment of the electrical motor and its associated water pump. The cover 34 is substantially transparent so that the setting of the timer which will be positioned within the housing 32 can be observed through the cover 34 without having to pivot the cover 34 into its open position. The cover 34 includes a downwardly extending peripheral edge 48 that overlaps the sides of the housing 32 when the cover is in its closed position so as to shed and prevent water from entering the housing interior.

The quick-connect brackets 36 are preferably pincer-shaped and have a curvature complimentary to the cylindrical peripheral shape of the electric motor housing. The brackets 36 are constructed from a resilient plastic which enables the brackets to be snap-fitted onto the cylindrical housing of the electric motor without using any tools. However, it should be understood that brackets 36 are just one of a wide variety of brackets that can be utilized in the present invention for securing the module 30 to the motor, and other types of brackets can be used with similar effect, including those which require tools for installing. In fact, in view of the mechanical couplings provided on the module connector 40 for maintaining the electrical connection with the motor power connector, as explained further below, the brackets 36 can be omitted altogether.

As shown in FIG. 2, the module connectors 38 and 40 are secured to an embossed portion 47 of the housing bottom surface 42 with jamb nuts 56 and 58, respectively, as is well known in the art. Alternatively, the connectors can be integrally molded with the housing 32, or threaded holes can be provided on the embossed portion 47 for threadingly connecting the module connectors to the housing. This latter alternative will require attention to the keying of the connectors, which prevents incorrect mating, so as to avoid alignment problems. Flange-type connectors can also be used with fasteners to secure the connectors to the housing, as can any other type of connectors.

In the preferred embodiment of the invention, the module connectors are provided on the bottom surface of the housing so as to minimize any potential for contact with water. Alternatively, the connectors can be provided on one or more of the sides of the housing although this results in more expensive tooling and construction for plastic housings than providing the connectors on the bottom surface. The least preferred position of the connectors is on the cover 34, where the connectors can interfere with the visibility and/or accessibility of the timer positioned within the housing 32.

Figure 3:
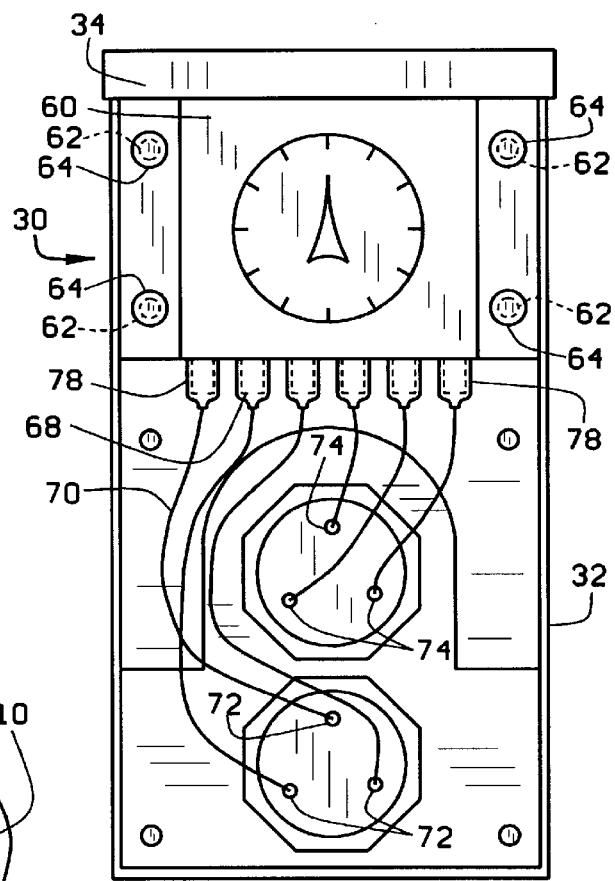
FIG. 3 is a top view of the module of FIG. 2 illustrating the electrical connections between a timer and the module connectors.

FIG. 3 illustrates the module 30 of the present invention after a timer 60 is positioned within the housing 32 and connected between the module connectors. The timer 60 includes several apertures 62 (shown in phantom) through which the alignment pins 52 extend to properly position the timer within the housing. Portions of the alignment pins extending through the apertures are then deformed or melted by exposure to ultrasonic energy to form coins 64 which permanently secure the timer to the housing and prevent its removal therefrom. Alternatively, the apertures 62 in the timer can be sized so that the alignment pins must be press-fit into the apertures 62 to attach the timer 60 to the housing 32. Where the timer or another type of electrical device is to be positioned within the housing 32 and connected between the module connectors by the consumer, this latter method for attaching the electrical device to the housing is preferred. However, the electrical device can also be attached to the housing with fasteners or in any other manner as apparent to those skilled in the art.

The timer 60 includes several male, blade-type terminals 68 (shown in phantom) extending outwardly from the side of the timer facing the module connectors. Several wire segments 70 are provided which have pins 72 or sockets 74 on one of their ends for insertion into the module connectors, and female, blade-type terminals 78 on their other ends. The female terminals 78 are complimentary to the male terminals 68, and mate therewith by sliding each female terminal 78 over a male terminal 68 as is well known in the art. The timer 60 of this preferred embodiment thus includes a separate male terminal 68 for each pin and socket of the module connectors, even though several of the male terminals 68 are connected internally within the timer 60 such as those terminals 68 used for conducting neutral voltages. As an alternative to the blade-type terminals, the timer 60 could be provided with insulated wire segments (also known as "pig-tails") having stripped ends for splicing, such as with wire nuts, to the wire segments 70 extending out of the module connectors. In fact, where the consumer will be selecting and installing an electrical device for use in the module 30 of the present invention, wire nut connections are preferred as they are believed to be the most user-friendly. However, where a timer, or some other electrical device, is to be pre-installed into the module so that the consumer will simply interpose the module between the power cable connector and the motor power connector, blade-type terminals are employed as they are believed to contribute to a lower manufacturing cost while exhibiting sufficiently high levels of reliability. The housing 32 can also be provided with an internal grounding post for making chassis ground connections, especially where the housing 32 is constructed from a conductive material rather than plastic.

Figure 4:
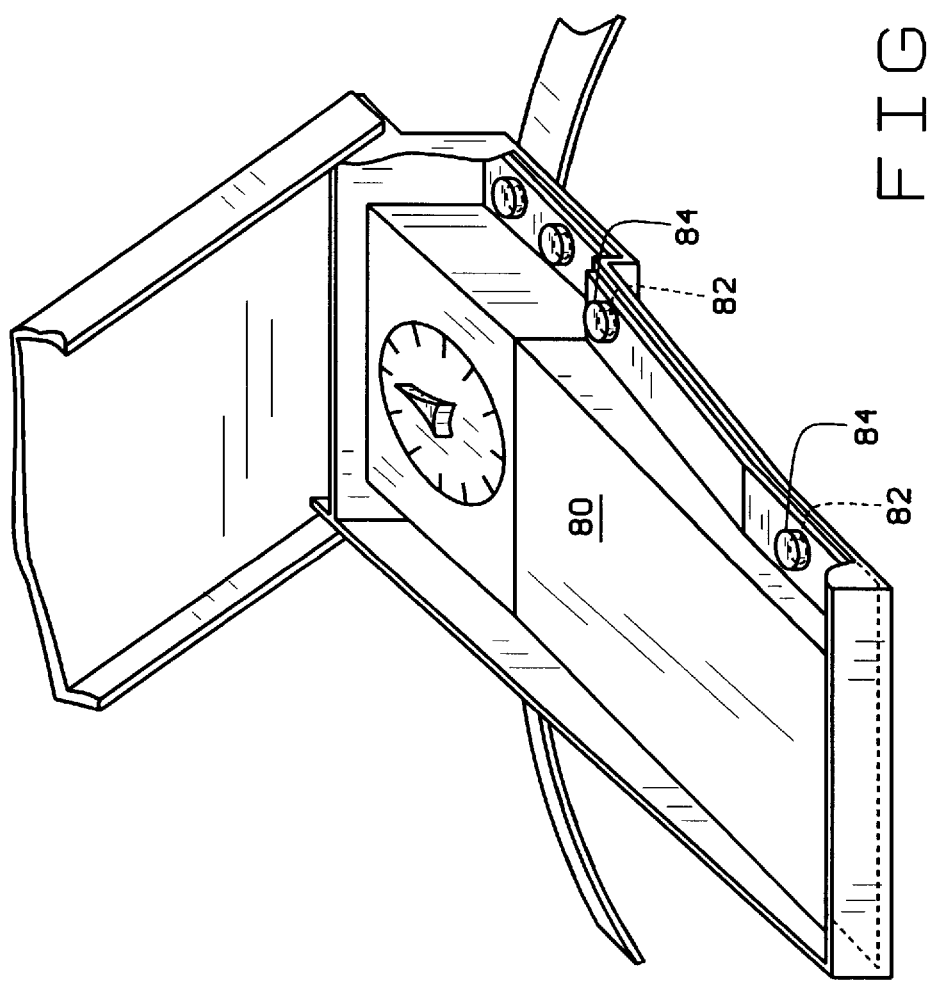
FIG. 4 is a partial isometric view of the module illustrating the timer and a protective shield secured therein.

Once the timer 60 is installed in the housing 32 and the electrical connections are made, a protective shield 80 is positioned over the terminals and the backsides of the module connectors to protect them from moisture or water, and to prevent a user of the timer from inadvertently contacting the terminals or connectors which may result in a serious electrical shock or damage to the module 30. As shown in FIG. 4, the protective shield 80 also includes several apertures 82 through which the alignment pins 54 extend when the shield 80 is positioned within the housing. Portions of the alignment pins 54 which protrude through the apertures 82 are ultrasonically deformed to form coins 84 which permanently secure the protective shield to the housing and prevent its removal therefrom.

Figure 5:
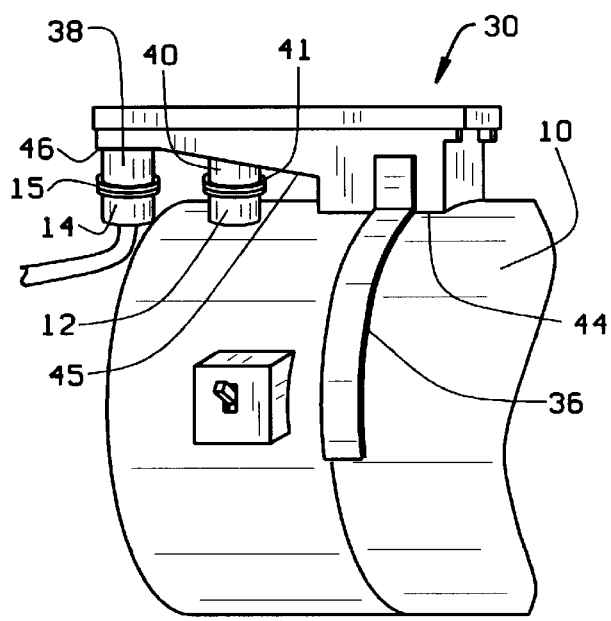
FIG. 5 is a partial front view of the electric pump motor of FIG. 1 with the module of FIG. 2 mounted thereon.

In accordance with the method provided by the present invention, the above-described module 30 can be used to connect an electrical device such as a timer to an existing electric motor. With reference to FIG. 1, the power cable connector 14 is first disconnected from the motor power connector 12 as shown. This entails mechanically decoupling a rotating ring 15 on the power cable connector 14 from the threaded periphery of the motor power connector 12 as is well known in the art. As shown in FIG. 5, the module 30 is then mounted on the electric motor 10, and the output connector 40 is electrically connected to the motor power connector 12. The output connector 40 also includes a rotating ring 41 for mechanically coupling the connector 40 to the motor power connector 12. This mechanical coupling maintains the electrical connection between the complementary connectors, and typically includes "keys" which prevent incorrect electrical mating.

As can be seen in FIG. 5, the tapered middle portion 45 of the housing bottom surface provides room for one to grasp the output connector 40 to align and mate the connector 40 with the motor power connector 12, and for grasping and twisting the rotating ring 41 as necessary. FIG. 5 illustrates the flat forward portion 46 of the housing bottom surface, which supports the input connector 38, as extending over the end of the electric motor 10 to provide sufficient room for electrically and mechanically coupling the power cable connector 14 to the module input connector 38. Also illustrated are the pincer-shaped brackets 36 which secure the module 30 to the cylindrical periphery of the electric motor housing. However, in view of the mechanical couplings provided between the mating connectors by way of the rotating rings and the threaded connector peripheries, and given that the flat rear portion 44 of the housing bottom surface rests on the top of the motor housing, the brackets 36 could be eliminated without substantially impacting the integrity of the module installation, if necessary.

In view of this description, it should be clear that the present invention provides an elegantly simple module and method for coupling an electrical device such as a timer to an existing electric motor. The method can thus be performed by the ordinary consumer without the use of tools, without incurring the cost and inconvenience of hiring an electrician, and without posing any serious risk of electrical shock. The end result is a whirlpool bath system having the added value and convenience of a timer, and a sense of self-gratification for the consumer who installed the timer without the assistance of others.

There are various changes and modifications which may be made to the invention as would be apparent to those skilled in the art. For example, while the electrical device used with the module of the present invention has been described as a timer, other electrical devices can also be used such as a meter for monitoring and/or displaying present operating conditions of the electric motor. The module of the present invention can also be used for easily adding an electrical receptacle adjacent to the electric motor for energizing devices other than the electric motor with the power cable. Furthermore, while the module of the present invention has been described as including a housing, the housing can be eliminated where the module connectors are otherwise supported by the electrical device or some other support structure. However, these changes or modifications are included in the teaching of the disclosure, and it is intended that the invention be limited only by the scope of the claims appended hereto, and their equivalents.

What is claimed is:

1. A module for connecting an electrical device to an electric motor, the motor having a power connector for mating with a power source connector to energize the motor, the module comprising:

an input connector configured for mating with the power source connector;

an output connector configured for mating with the motor power connector; and a support for the electrical device, the support having an exterior surface and the input connector and the output connector being rigidly secured to the support exterior surface.

2. The module of claim 1 wherein the support exterior surface includes a bottom surface and the module input connector and output connector are secured to the support bottom surface.

3. The module of claim 2 wherein the support includes at least one alignment pin extending upwardly from the support bottom surface for insertion into an aperture in the electrical device.

4. The module of claim 1 further comprising a cover pivotably attached to the support.

5. The module of claim 4 wherein the cover is substantially transparent.

6. The module of claim 1 further comprising at least one quick connect bracket for securing the module to the motor.

7. The module of claim 6 wherein the bracket is pincer-shaped.

8. A module for coupling an electrical device to an electric motor, the motor having a power connector for mating with a power source connector to energize the motor, the module comprising:

an input connector configured for mating with the power source connector;

an output connector configured for mating with the motor power connector, and configured for physically securing the module to the motor when the output connector and the motor power connector are mated;

the electrical device electrically connected between the input connector and the output connector; and a support for the electrical device, the support having an exterior surface and the input connector and the output connector being rigidly secured to the support exterior surface.

9. The module of claim 8 wherein the electrical device is a timer.

10. The module of claim 8 wherein the support is a housing wherein the module input connector and output connector are secured to the housing and the electrical device is positioned within the housing.

11. The module of claim 10 wherein the housing has at least one drain hole extending therethrough.

12. The module of claim 10 wherein the housing has a bottom surface and the module input connector and output connector are secured to the housing bottom surface.

13. The module of claim 12 wherein at least a portion of the housing bottom surface is tapered or otherwise relieved to thereby provide room for grasping and mating the module output connector with the motor power connector.

14. The module of claim 12 wherein the module input connection is positioned on the housing bottom surface so as to extend over one end of the motor when the module output connector is mated with the motor power connector to thereby provide room for grasping and mating the module input connector with the power source connector.

15. The module of claim 10 further comprising at least one bracket attached to the housing for securing the module to the motor.

16. The module of claim 8 wherein the module output connector includes an electrical coupling and a mechanical coupling complementary to an electrical coupling and a mechanical coupling on the motor power connector.

17. The module of claim 8 further comprising a protective shield positioned over the electrical connections between the electrical device and the module connectors.

18. A method for retrofitting an electric motor to include an electrical device of a type not previously associated with the electric motor, the electric motor including a power connector mated with a power source connector the method comprising the steps of:

disconnecting the power source connector from the motor power connector;

connecting a module output connector of a module having an input connector and an output connector to the motor power connector; and connecting the power source connector to the module input connector.

19. The method of claim 18 further comprising the step of electrically connecting the electrical device between the module connectors.

20. The method of claim 19 wherein the module includes a housing, the method further comprising the step of positioning the electrical device within the module housing.

21. The method of claim 18 wherein the type of electrical device is a timer.

* * * * *